United States Patent [19]

Wohltjen et al.

[11] 4,452,624

[45] Jun. 5, 1984

[54] METHOD FOR BONDING INSULATOR TO INSULATOR

[75] Inventors: Henry Wohltjen, Burke, Va.; John F. Giuliani, Kensington, Md.

[73] Assignee: The United States of America as represented by the Secretary of the Navy, Washington, D.C.

[21] Appl. No.: 451,893

[22] Filed: Dec. 21, 1982

[51] Int. Cl.³ .................. C03B 23/20; C03C 27/04
[52] U.S. Cl. ............................... 65/40; 65/43; 65/59.3; 65/59.6; 204/16
[58] Field of Search ............. 65/40, 43, 59.3, 59.6; 204/16

[56] References Cited

U.S. PATENT DOCUMENTS 3,540,957 11/1970 Bawa et al. ................. 65/43 X

FOREIGN PATENT DOCUMENTS 2301170 8/1973 Fed. Rep. of Germany .......... 65/40

Primary Examiner—Robert L. Lindsay, Jr.
Attorney, Agent, or Firm—Robert F. Beers; William T. Ellis; Alan P. Klein

[57] ABSTRACT

A method for making an airtight seal between a pair of insulator elements, such as glass plates, without destroying any fine structure etched in the insulator elements. A thin metal film is deposited on one of the elements to be sealed and then placed in intimate contact with the other element to be sealed. The elements are then heated to a temperature well below their softening point, but high enough to significantly enhance the ion mobility in the insulator. A voltage is applied across the interface and the resulting anodic reaction consumes the film at the interface while producing a strong hermetic bond between the insulator elements.

15 Claims, 2 Drawing Figures

METHOD FOR BONDING INSULATOR TO INSULATOR

BACKGROUND OF THE INVENTION

The present invention relates generally to bonding methods, and more particularly to methods of bonding insulator elements together.

Heretofore, the bonding of insulator elements, such as glass pieces, to one another has been accomplished by heating the pieces to a temperature above their softening point, pressing them together, and allowing them to cool. More recently, adhesives have been developed which permit the rigid bonding of glass articles at room temperatures. Unfortunately, neither of these techniques is appropriate if fine structures which have been etched into the glass pieces are to be preserved. For example, a micro-capillary tube can be produced by etching a groove into a piece of glass and sealing another piece of glass on top of it. The high-temperature bonding technique frequently results in flow of the glass into the etched region, thus destroying its original structure. Adhesives, too, will often flow into the etched region. Previously, the micro-capillary type of tube could only be made by etching a semiconductor, such as a silicon wafer, and anodically bonding a glass cover onto the semiconductor. The anodic bonding process is disadvantageously expensive, and limited to the maximum size of available single crystal silicon wafers, i.e., about six inches in diameter. The ability to form capillary tubes completely in glass is desirable because of its reduced cost, better material properties, and unrestricted size.

The anodic bonding process is described in U.S. Pat. No. 3,397,278 which issued to D. I. Pomerantz on Aug. 13, 1968. This patent deals solely with the bonding of insulators to metals, and insulators to semiconductors. The bonding is accomplished by placing the pieces to be bonded in intimate contact, heating them to a temperature below the softening point, and applying an electric field. An anodic reaction occurs at the glass-to-semiconductor interface or the glass-to-metal interface, and results in a strong, hermetic bond. There is no suggestion in this patent of sealing two insulators together, because the anodic reaction at the interface would not be possible.

SUMMARY OF THE INVENTION

It is therefore an object of this invention to bond a pair of insulator elements together without destroying any fine structures etched in the insulator elements.

Another object is to make such a bond at temperatures far below the softening point of the insulator elements.

These and other objects of the present invention are achieved by a method for making an airtight seal between a pair of insulator elements, wherein one of the insulator elements is first coated with a thin metal film, and then the other insulator element and the metal film are placed in close surface contact. After heating one of the insulator elements to a temperature below its softening point, but high enough to render it electrically conductive, a small positive current is passed from the thin metal film to the heated insulator element. The thin metal film is consumed and a airtight seal is produced between the pair of insulator elements. In the case of glass-to-glass seals, the resulting bond is transparent.

The following significant advantages over previous glass to glass sealing techniques can be enumerated:

(1) The technique uses low temperatures, considerably below the softening point of the glass.

(2) Fine structural detail in the glass surface are preserved.

(3) The resulting bond is homogeneous and free of adhesives.

These characteristics are very important to the microfabrication of micro-chemical instrumentation (e.g. miniature gas chromatographs, liquid chromatographs, etc.)

Additional advantages and features will become apparent as the subject invention becomes better understood by reference to the following detailed description when considered in conjunction with the accompanying drawings wherein:

DESCRIPTION OF THE PREFERRED EMBODIMENT

Figure 1:
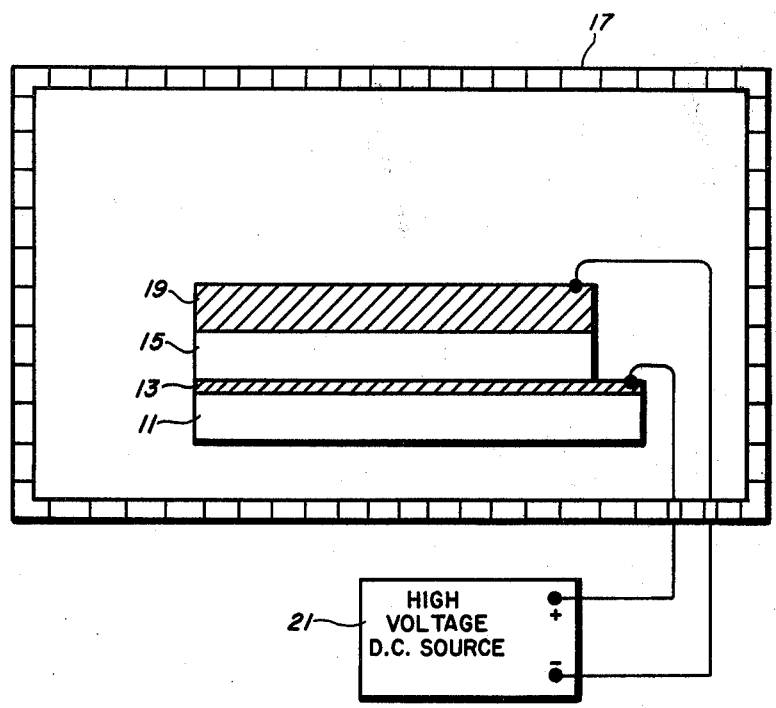
FIG. 1 is a diagrammatic view of an embodiment of the process of the present invention.

Referring to FIG. 1, the method for making an airtight seal between a pair of insulator elements at temperatures far below the softening point includes a first step in which one of the insulator elements 11 is coated with a thin metal film 13 by vapor deposition or the like. The insulator elements may comprise glass or ceramic elements, for example.

Next, the second step is performed, whereby the thin metal film 13 and the other insulator element 15 are placed in surface contact, as by clamping the insulator elements together, for example.

In the third step, one of the insulator elements (e.g., 15) is heated to a temperature below its softening point but high enough to render the heated insulator element sufficiently electrically conductive to pass a finite current. While the heating step may take a variety of forms, conveniently it may take the form illustrated in FIG. 1, wherein the heating step is accomplished by placing the insulator elements 11 and 15 in an oven 17.

Finally, the fourth step is performed to pass a small positive current from the thin metal film 13 to the heated insulator element 15 to consume the thin metal film 13 and produce an airtight seal between the pair of insulator elements 11 and 15. It is understood that the expression "pass a positive current" from a first component to a second component means that the first component is the anode or positive side, and that the current is flowing in a direction opposite the direction of electron flow as conveniently described. While the current-passing step may take a variety of forms, conveniently it may take the form illustrated in FIG. 1, wherein a removable thick metal electrode 19 is placed on the exposed end of the heated insulator element 15 and the thick metal electrode and the thin metal film 13 are connected to the negative and positive terminals, respectively, of a high voltage d.c. source 21. It is understood that as the current is drawn from the voltage source 21, an anodic reaction takes place, wherein the thin metal film 13 is oxidized and diffuses into the heated insulator element 15 under the influence of the applied electrostatic field (i.e., the thin metal film or anode is sacrificed). At the same time, the opposing surfaces of the insulator element 11 and 15 are drawn together by the electrostatic field and form an airtight insulator-to-insulator seal.

Neither insulator element undergoes melting either by the heat or by the current. The heating renders the insulator element 15 conductive. The bonding is effected solely by the step of passing a positive current from the thin metal film 13 to the heated insulator element 15.

The anodic reaction is complete when the current reaches zero. The thick metal electrode 19 can then be removed from the exposed end of the heated insulator element 15.

For a clearer understanding of the invention, a specific example of it is set forth below. This example is merely illustrative and is not to be understood as limiting the scope and underlying principles of this invention in any way.

EXAMPLE

Figure 2:
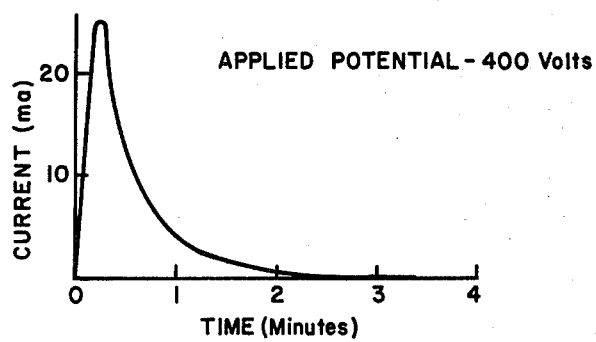
FIG. 2 graphically shows typical current versus time behavior for the sealing of two soda lime glass microscope slides.

A glass capillary tube was manufactured starting with a 25 mm by 75 mm soda lime glass microscope slide. A spiral groove was etched in the slide using conventional photolithography and acid etching. A thin aluminum film in the range of 400 to 2000 Angstroms thick was evaporated on another 25 mm by 75 mm microscope slide and the metallized slide was placed in contact with the etched slide. The slides were clamped together and heated in an oven to a temperature in the range of 200° to 600° C., after which a voltage of 200 to 1200 volts was applied across the interface. Sealing was complete in a time ranging from about 10 seconds to 10 minutes, depending upon conditions. The sealing time was measured by monitoring the current versus time (shown in FIG. 2), and determining when the current reached zero. Trace aluminum remaining in the non-sealed etched areas was removed by a simple acid wash. The composite had the characteristics of a single uniform piece of glass. The seal was strong and transparent, and the integrity of the glass-to-glass bond was not affected by extended exposure to acids.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. A method for making an airtight seal between a pair of insulator elements without destroying any fine structures etched in the insulator elements, comprising the steps of:
   (a) coating one of the pair of insulator elements with a thin metal film;
   (b) placing the other insulator element and the thin metal film in close surface contact;
   (c) heating one of the insulator elements to a temperature below its softening point but high enough to render the heated insulator element sufficiently electrically conductive to pass a finite current; and
   (d) passing a finite positive current from the thin metal film to the heated insulator element to consume the thin metal film and produce an airtight seal between the pair of insulator elements.

2. The method recited in claim 1 wherein:
the insulator is glass.

3. The method recited in claim 2 wherein:
the insulator is soda lime glass.

4. The method recited in claim 3 wherein:
the metal is aluminum.

5. The method recited in claim 4 wherein:
the one insulator element is coated with a thin metal film in the range of 400 to 2000 Angstroms thick in step (a).

6. The method recited in claim 5 wherein:
the one insulator element is heated to a temperature in the range of 200° to 600° C. in step (c).

7. The method recited in claim 6 wherein step (d) includes the step of:
applying a voltage between the thin metal film and the heated insulator element.

8. A method for making an airtight seal between a pair of soda lime glass elements without destroying any fine structures etched in the soda lime glass elements, comprising the steps of:
   (a) coating one of the pair of soda lime glass elements with a thin aluminum film in the range of 400 to 2000 Angstroms thick;
   (b) placing the other soda lime glass element and the thin aluminum film in close surface contact;
   (c) heating one of the soda lime glass elements to a temperature in the range of 200° to 600° C. to render the heated soda lime glass element sufficiently electrically conductive to pass a finite current; and
   (d) passing a finite positive electric current from the thin aluminum film to the heated soda lime glass element to consume the thin aluminum film and produce an airtight seal between the pair of soda lime glass elements,
   step (d) including the step of applying a voltage of 200 to 1200 volts between the thin aluminum film and the heated soda lime glass element.

9. The method recited in claim 8 wherein:
the voltage is applied for a time ranging from about 10 seconds to 10 minutes in step (d).

10. The method recited in claim 9 wherein:
step (a) is accomplished by vapor-depositing the thin aluminum film on the one soda lime glass element.

11. The method recited in claim 10 wherein:
step (b) is accomplished by clamping the pair of soda lime glass elements together.

12. The method recited in claim 11 wherein:
step (c) is accomplished by placing the pair of soda lime glass elements in an oven.

13. The method recited in claim 12 wherein step (d) includes the step of:
placing a removable thick metal electrode on the exposed end of the soda lime glass element that is heated.

14. The method recited in claim 13 wherein step (d) includes the step of:
connecting the thick metal electrode and the thin aluminum film to the negative and positive terminals, respectively, of a voltage d.c. source.

15. A method for making an airtight seal between a pair of soda lime glass elements without destroying any fine structures etched in the soda lime glass elements, comprising the steps of:
   (a) vapor-depositing a thin aluminum film in the range of 400 to 2000 Angstroms thick on one of the pair of soda lime glass elements;
   (b) clamping the pair of soda lime glass elements together to place the other soda lime glass element and the aluminum film in close surface contact;

(c) heating one of the soda lime glass elements in an oven to a temperature in the range of 200° to 600° C. to render the heated soda lime glass element sufficiently electrically conductive to pass a finite current; and (d) passing a finite positive current from the thin aluminum film to the heated soda lime glass element to consume the thin aluminum film and produce an airtight seal between the pair of soda lime glass elements, step (d) including the steps of placing a removable thick metal electrode on the exposed end of the soda lime glass element that is heated; connecting the thick metal electrode and the thin aluminum film to the negative and positive terminals, respectively, of a 200 to 1200 volt d.c. source for a time ranging from about 10 seconds to 10 minutes; and removing the thick metal electrode from the exposed end of the heated insulator element after the airtight seal is formed between the pair of soda lime glass elements.

* * * * *